(12) United States Patent
Mizoguchi et al.

(10) Patent No.: US 9,762,776 B2
(45) Date of Patent: Sep. 12, 2017

(54) DEVICE AND METHOD FOR RESIZING IMAGE, AND IMAGING DEVICE

(71) Applicant: SOCIONEXT INC., Yokohama-shi, Kanagawa (JP)

(72) Inventors: Yusuke Mizoguchi, Nagoya (JP); Kunihiro Oohara, Tajimi (JP)

(73) Assignee: SOCIONEXT, INC., Yokohama (JP)

( * ) Notice: Subject to any disclaimer, the term of this patent is extended or adjusted under 35 U.S.C. 154(b) by 205 days.

(21) Appl. No.: 14/037,936

(22) Filed: Sep. 26, 2013

(65) Prior Publication Data

US 2014/0092273 A1   Apr. 3, 2014

(30) Foreign Application Priority Data

Oct. 2, 2012 (JP) ................................ 2012-220494

(51) Int. Cl.
| | | |
|---|---|---|
| *H04N 5/225* | (2006.01) | |
| *H04N 5/345* | (2011.01) | |
| *H04N 5/369* | (2011.01) | |
| *H04N 5/376* | (2011.01) | |

(52) U.S. Cl.
CPC .......... *H04N 5/225* (2013.01); *H04N 5/3456* (2013.01); *H04N 5/3698* (2013.01); *H04N 5/3765* (2013.01)

(58) Field of Classification Search
None
See application file for complete search history.

(56) References Cited

U.S. PATENT DOCUMENTS

| 6,867,803 | B1 | 3/2005 | Funamoto |
| 2002/0057349 | A1 | 5/2002 | Yamaguchi et al. |
| 2005/0128493 | A1 | 6/2005 | Nemoto et al. |
| 2008/0291304 | A1 | 11/2008 | Ota et al. |

(Continued)

FOREIGN PATENT DOCUMENTS

| CN | 1168595 A | 12/1997 |
| CN | 101079230 A | 11/2007 |
| CN | 101262552 A | 9/2008 |

(Continued)

OTHER PUBLICATIONS

JP 2010-130108 translation.*

(Continued)

*Primary Examiner* — Twyler Haskins
*Assistant Examiner* — Angel L Garces-Rivera
(74) *Attorney, Agent, or Firm* — Arent Fox LLP

(57) ABSTRACT

A clock signal generator that generates a second clock signal and clock information from a transfer first clock signal and based on a thinning rate, the number of horizontal pre-blank data pieces, the number of effective horizontal pixels, and the number of horizontal post-blank data pieces stored in a register. A thinning processor retrieves image data in accordance with the first clock signal and a horizontal synchronization signal. The thinning processor performs a thinning process on the image data to generate thinned image data and stores the thinned image data in a memory. A read controller sequentially reads the thinned image data from the memory in accordance with the second clock signal having a frequency lower than the first clock signal.

7 Claims, 10 Drawing Sheets

(56) References Cited

U.S. PATENT DOCUMENTS

2011/0058079 A1    3/2011  Ota et al.

FOREIGN PATENT DOCUMENTS

| JP | 2000-224604 A | 8/2000 |
|----|---------------|--------|
| JP | 2001-238190 A | 8/2001 |
| JP | 2005-303588 A | 10/2005 |
| JP | 2006-003481 A | 1/2006 |
| JP | 2007-028225 A | 2/2007 |
| JP | 2007-325031 A | 12/2007 |
| JP | 2010-068414 A | 3/2010 |
| JP | 2010-130108 A | 6/2010 |

OTHER PUBLICATIONS

Chinese Office Action of related Chinese Patent Application No. 201310456327.5 dated May 18, 2016.
Japanese Office Action of related Japanese Patent Application No. 2012-220494 dated Jun. 14, 2016.
Japanese Office Action of related Japanese Patent Application No. 2012-220494 dated Dec. 28, 2016.

* cited by examiner

DEVICE AND METHOD FOR RESIZING IMAGE, AND IMAGING DEVICE

CROSS-REFERENCE TO RELATED APPLICATIONS

This application is based upon and claims the benefit of priority from prior Japanese Patent Application No. 2012-220494, filed on Oct. 2, 2012, the entire contents of which are incorporated herein by reference.

FIELD

The present disclosure relates to a device and method for processing an image, and an imaging device.

BACKGROUND

An imaging device such as a digital still camera and the like converts an imaging signal acquired by, for example, a charge coupled device (CCD) image sensor to image data, processes the image data with a plurality of processing units, and stores the processed image data in a memory. Refer to, for example, Japanese Laid-Open Patent Publication Nos. 2010-130108 and 2010-68414.

SUMMARY

According to an aspect of the embodiments, an image processing device is provided. The image processing device includes a thinning processor that receives image data output from an image sensor for a certain period in accordance with a first clock signal, wherein the thinning processor performs a thinning process on effective data to generate thinned image data contained in the image data based on the number of effective horizontal pixels in the effective data and a thinning rate, and the thinning processor stores the thinned image data in a memory; a clock signal generator that generates a second clock signal having a frequency based on the number of data pieces of the image data provided in the certain period, the number of effective horizontal pixels, and the thinning rate; and a read controller that reads the thinned image data from the memory in accordance with the second clock signal.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

DESCRIPTION OF EMBODIMENTS

One embodiment of an image processing device and an imaging device will now be described with reference to the drawings.

Figure 1:
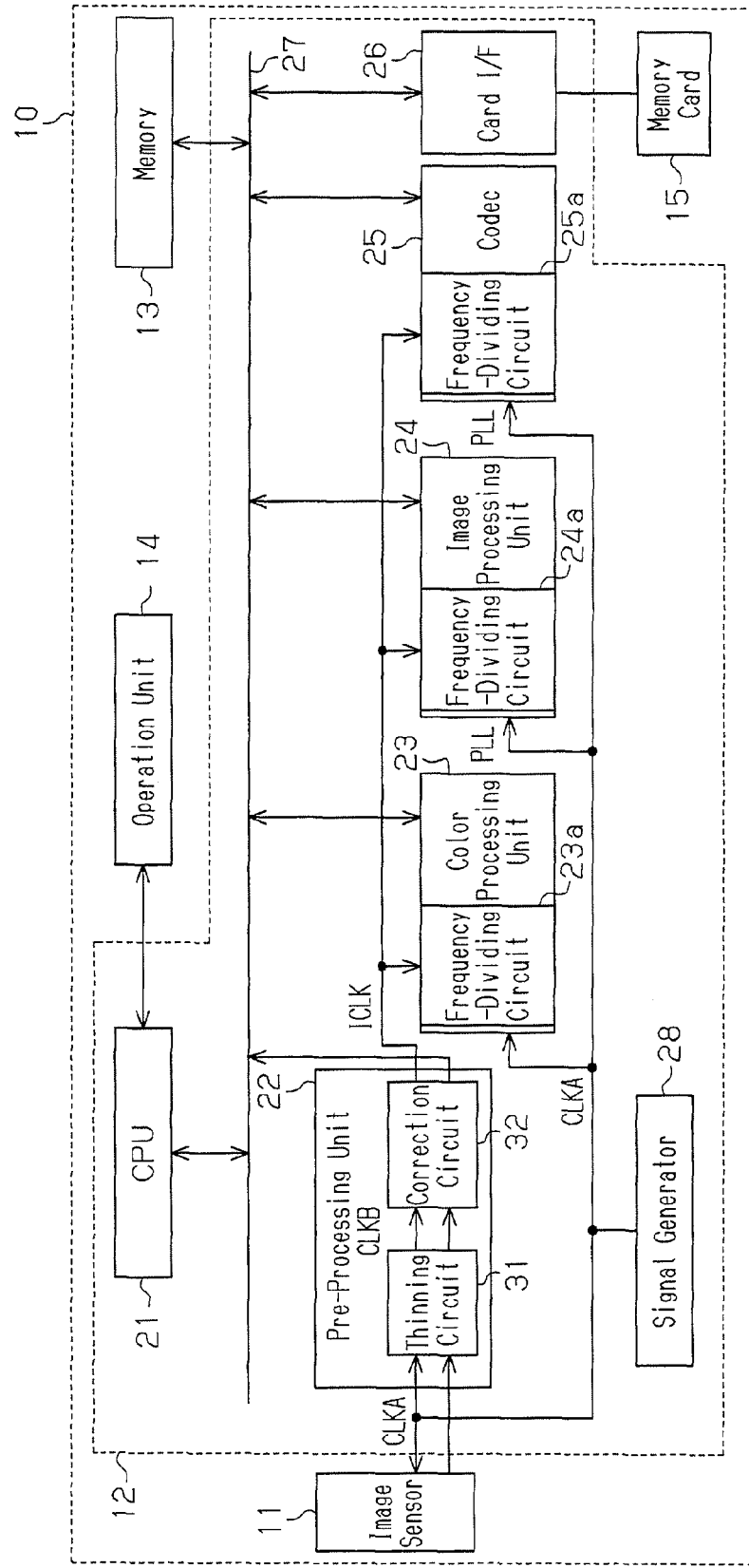
FIG. 1 is a schematic view of an imaging device.

As illustrated in FIG. 1, an imaging device 10 includes an image sensor 11, an image processing device 12, a memory 13, and an operation unit 14.

The image sensor 11 includes, for example, a two-dimensional array of a plurality of imaging elements. Each imaging element is, for example, a CCD, a CMOS, or the like. The image sensor 11 outputs image data acquired by the plurality of imaging elements for each single picture (single frame). The image processing device 12 performs various types of image processing on the image data output from the image sensor 11. The image processing may correspond to an operation mode set through the operation unit 14. The operation unit 14 includes a touch panel and various types of switches. The operation unit 14 is operated to set, for example, imaging conditions, the size of the generated image data, and the processing of the image data. The image processing device 12 stores the image data at a certain processing stage in the memory 13. The memory 13 is a rewritable memory such as a synchronous dynamic random access memory (SDRAM). The image processing device 12 stores, in a memory card 15, the image data subject to a process that is set in advance or corresponds to the operation of the operation unit 14.

The image processing device 12 includes a central processing unit (CPU) 21, a pre-processing unit 22, a color processing unit 23, an image processing unit 24, a codec 25, a card interface 26 (indicated as "card I/F"), and a bus 27 that connects these elements to one another.

The image processing device 12 includes a timing signal generator 28 which generates and outputs a timing signal. The timing signal includes a first clock signal CLKA, a horizontal synchronization signal SHA, and a vertical synchronization signal SVA. The image sensor 11 operates in accordance with the first clock signal CLKA to convert incident light to an electrical signal and generate image data GDA for each frame, and to output the image data GDA in accordance with the horizontal synchronization signal SHA, the vertical synchronization signal SVA, and the first clock signal CLKA.

The pre-processing unit 22 receives the image data GDA output from the image sensor 11 in response to the synchronization signal, and stores the image data GDA in the memory 13.

The color processing unit 23 reads the image data from the memory 13 and converts the format of the read image data. For example, the color processing unit 23 converts image data (Bayer data) in the RGB format to image data in the YCbCr format, and stores the converted image data in the memory 13.

The codec 25 reads the image data stored in the memory 13, encodes the read image data in accordance with a certain process, such as the Joint Photographic Experts Group (JPEG) process, and stores the encoded image data in the memory 13.

The image processing unit 24 may be one or a plurality of processing units. The image processing unit 24 executes, for example, resolution conversion for changing the number of pixels of one frame, color tone conversion for converting the color tone of the image to sepia or the like, edge enhancement, and noise removal. The image processing unit 24 reads the image data stored in the memory 13, performs a certain image processing on the image data, and stores the processed image data in the memory 13.

The card interface 26 is connected to the memory card 15, which is attached to a memory slot or the like of the imaging device 10, and inputs and outputs data to and from the memory card 15. The memory card 15 stores the image data stored in the memory 13 or the image data generated by the image processing unit 24 or the codec 25. The memory card 15 may also store RAW data.

The CPU 21 controls various components in the image processing device 12. The CPU 21 sets processing information corresponding to the operation mode selected through the operation unit 14 to each processing unit. For example, the CPU 21 sets the image size selected through the operation unit 14 to the pre-processing unit 22. The set image size is the magnitude of the image data saved in the memory 13, and specified by the number of horizontal pixels and the number of vertical pixels.

The size information corresponding to the image sensor 11 is set in advance to the pre-processing unit 22. The size information indicates the size of the image data output from the image sensor 11. In one example, the size information indicates the number of data pieces of effective data and blank data contained in the image data output from the image sensor 11.

Figure 5:
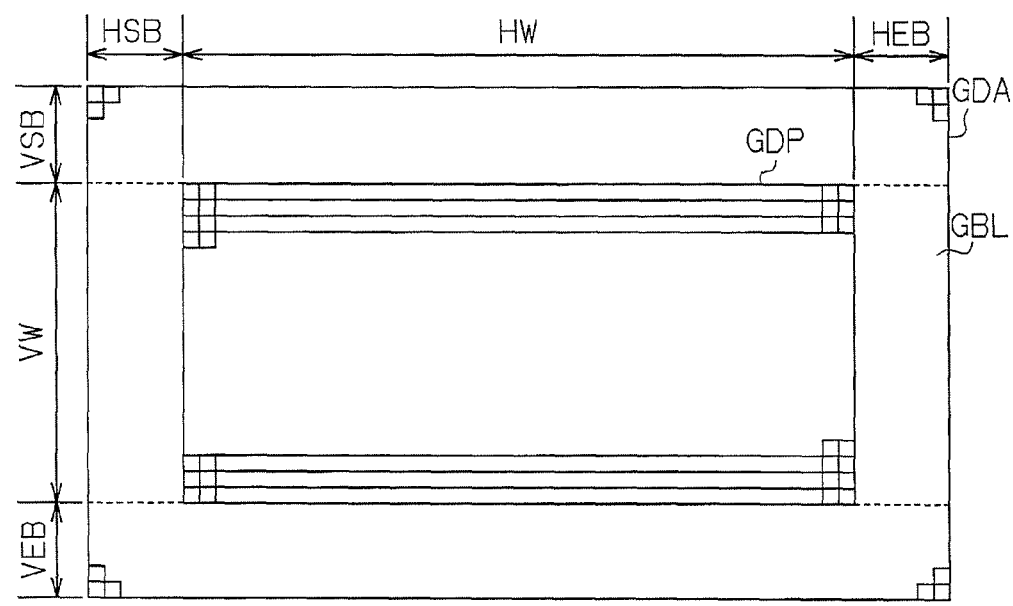
FIG. 5 is a diagram illustrating image data.

FIG. 5 illustrates the image data GDA for a single frame output from the image sensor 11. The image data GDA for a single frame includes effective data GDP that corresponds to the image imaged by the image sensor 11, and blank data GBL that does not correspond to the imaged image. The image data GDA is configured by plural line data. The image sensor 11 outputs the line data in response to the horizontal synchronization signal SHA. Each line data includes a plurality of data pieces, and each data piece indicates a pixel value or a blank value. The number of lines of the effective data GDP is referred to as the number of vertical effective pixels VW. The number of data pieces of the effective data GDP contained in a single line of data is referred to as the effective horizontal pixel number HW. The line data before the head line data of the effective data GDP is referred to as vertical pre-blank data, and the number of lines of the vertical pre-blank data is referred to as the number of vertical pre-blank data pieces VSB. The line data after the final line data of the effective GDP is referred to as the vertical post-blank data, and the number of lines of the vertical post-blank data is referred to as the number of vertical post-blank data pieces VEB. The data before the effective data GDP in each line data is referred to as the horizontal pre-blank data, and the number of data pieces of the horizontal pre-blank data is referred to as the horizontal pre-blank data piece number HSB. The data after the effective GDP in each line data is referred to as the horizontal post-blank data, and the number of data pieces of the horizontal post-blank data is referred to as the number of horizontal post-blank data pieces HEB.

As illustrated in FIG. 1, the pre-processing unit 22 includes a thinning circuit 31 and a correction circuit 32. The thinning circuit 31 performs a thinning process on the effective data (see FIG. 5) contained in each line data of the image data GDA, and generates image data (also referred to as the thinned image data) of the number of data pieces corresponding to the set image size. The set image size is the number of data pieces corresponding to the magnitude of the image data to be stored in the memory 13, and may be number of horizontal pixels and number of vertical pixels, for example. The pre-processing unit 22 is set with a thinning rate for generating the thinned image data from the original image data. In one example, the thinning rate is the ratio of the number of data pieces of the thinned image data specified by the set image size for the number of data pieces (number of pixels) of the effective data GDP of a single line output by the image sensor 11. The pre-processing unit 22 performs the thinning process based on the thinning rate, and resizes the original image data (original size) output from the image sensor 11 to the image data (set image size) for storage in the memory 13.

The thinning process will now be described.

Figure 4:
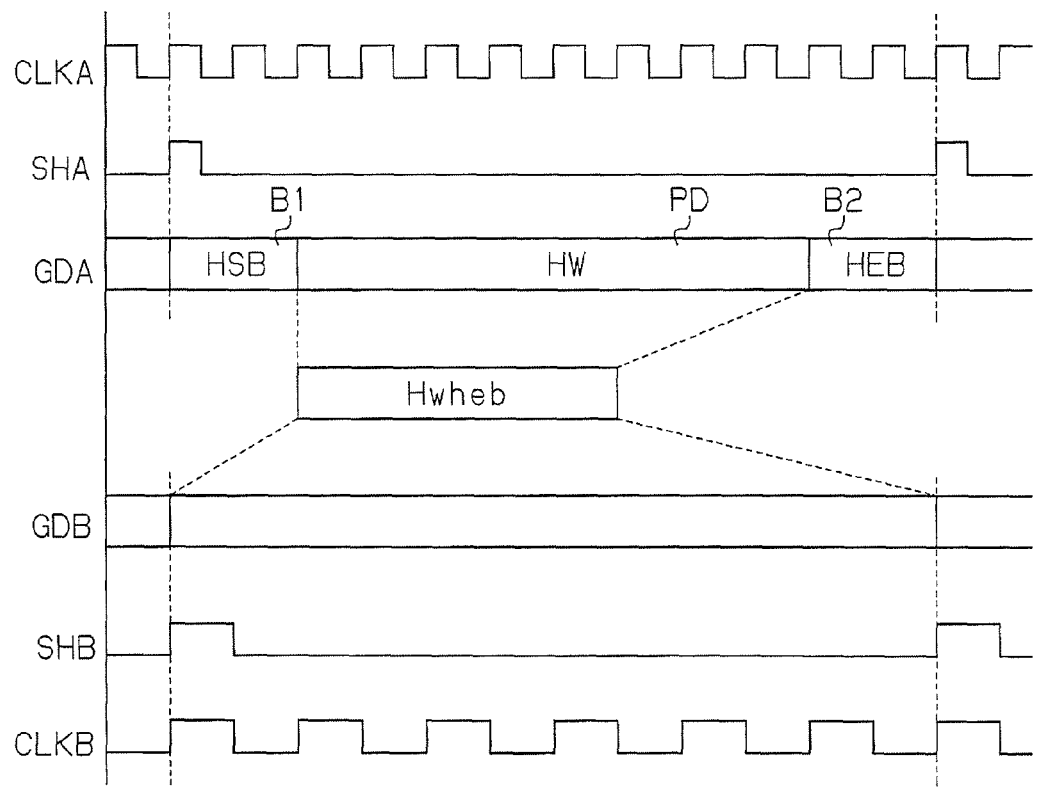
FIG. 4 is a chart illustrating a horizontal thinning process.

In the example illustrated in FIG. 4, the image sensor 11 outputs one line data of the image data GDA, that is, the horizontal pre-blank data B1 of the horizontal pre-blank data piece number HSB, the effective image data PD (effective pixel data) of the effective horizontal pixel number HW, and the horizontal post-blank data B2 of the number of horizontal post-blank data pieces HEB during one horizontal scanning period, which is from one horizontal synchronization signal SHA to the next horizontal synchronization signal SHA. The number of data pieces HIS the thinning circuit 31 retrieves during the horizontal synchronization signal SHA (one horizontal scanning period) is the total of the number horizontal pre-blank data pieces HSB, the effective horizontal pixel number HW, and the number of horizontal post-blank data pieces HEB (HIS=HSB+HW+HEB).

The thinning process for resizing the image data GDP is performed based on the thinning rate HOW. The thinning rate HOW is the ratio of the number of pixels (e.g., number of data pieces) of the image data retrieved by the thinning circuit 31 and the number of pixels (e.g., number of data pieces) of the image data output by the thinning circuit 31, or a set value corresponding to such a ratio. For example, the thinning rate HOW is the number of input pixels required for the thinning circuit 31 to output the image data of one pixel. For example, if the thinning rate HOW is 2, the thinning circuit 31 retrieves the image data of two pixels, and outputs the image data of one pixel. The number of data pieces HOS of the image data output by the thinning circuit 31 may be a value obtained by dividing the effective horizontal pixel number HW of the image data retrieved by the thinning circuit 31 by the thinning rate HOW (HOS=HW/HOW).

The thinning circuit 31 outputs the image data of the output data piece number HOS during a transfer period of the image data of the number of input data pieces HIS, that is, one horizontal scanning period. The thinning circuit 31 outputs the image data of the output data piece number HOS in accordance with a second clock signal CLKB.

The period in which the thinning circuit 31 outputs one image data piece, that is, a cycle $\lambda b$ of the second clock signal CLKB is longer than a cycle of the first clock signal CLKA in which one input image data piece is transferred. For example, assuming the cycle of the first clock signal CLKA is "1", the cycle $\lambda b$ of the second clock signal CLKB is calculated from the following equation.

$$\lambda b = \text{number of input data pieces } HIS/\text{output data piece number } HOS =$$
$$(HSB + HW + HEB)/(HW/HOW)$$

The cycle λb is the ratio of the cycle of the second clock signal CLKB relative to the cycle of the first clock signal CLKA and may be refereed to as an output clock ratio.

The operation of the clock generation circuit for generating the second clock signal CLKB from the first clock signal CLKA is set in accordance with the cycle λb of the second clock signal CLKB. For example, when the clock generation circuit generates the second clock signal CLKB with a frequency-dividing circuit, the frequency-dividing ratio in the frequency-dividing circuit may be a maximum integer that does not exceed the cycle λb of the clock signal CLKB calculated in the above manner.

To compare the image data GDA provided to the thinning circuit 31 and the image data GDB output by the thinning circuit 31, FIG. 4 illustrates the positions of the horizontal synchronization signals SHA, SHB respectively corresponding to the image data GDA and the image data GDB in conformance. FIG. 4 illustrates a comparison of the data amount of the effective data contained in the image data GDA and the data amount of the image data after the thinning process. Actually, the thinning circuit 31 stores the image data GDB that has undergone the thinning process corresponding to the retrieved image data GDA in an internal memory 44, and subsequently outputs the image data GDB in the memory 44.

The correction circuit 32 performs correction processing on the image data GDB that has undergone the thinning process output from the thinning circuit 31. The correction processing may be, for example, white balance adjustment or gain adjustment, or correction of a defective signal. The correction circuit 32 stores the corrected image data in the memory 13. The computation load and time for the correction of the resized image data GDB are less than the computation load and time for the correction of the image data GDA of the original size. Therefore, the computation load of the image processing device 12 including the correction circuit 32 is reduced and the processing time is reduced by performing the correction processing on the resized image data GDB with the correction circuit 32.

The thinning circuit 31 generates the second clock signal CLKB, and the synchronization signals SHB, SVB according to the generated image data GDB that has undergone the thinning process. The second clock signal CLKB and the synchronization signals SHB, SVB each have a cycle corresponding to the number of data pieces of the image data GDB generated by the thinning process. The correction circuit 32 operates in synchronization with the second clock signal CLKB and the synchronization signals SHB, SVB output from the thinning circuit 31, and performs the correction processing on the resized image data GDB. The frequency of the second clock signal CLKB is lower than the frequency of the first clock signal CLKA for transferring the image data of the original size. Therefore, the number of operations of the correction circuit 32 operating in accordance with the second clock signal CLKB is reduced compared to the number of operations of the correction circuit 32 operating in accordance with the first clock signal CLKA. This reduces the power consumption in the correction processing period of the correction circuit 32.

The thinning circuit 31 outputs clock information ICLK corresponding to the generated second clock signal CLKB. The clock information ICLK indicates the state of the second clock signal CLKB relative to the first clock signal CLKA. In an example in which the thinning circuit 31 frequency-divides the first clock signal CLKA to generate the second clock signal CLKB, the clock information ICLK may be a frequency-dividing ratio of the second clock signal CLKB with respect to the first clock signal CLKA.

The clock information ICLK is provided to each of the color processing unit 23, the image processing unit 24, and the codec 25. The color processing unit 23 includes a frequency-dividing circuit 23a for generating an operation clock signal from the first clock signal CLKA. The color processing unit 23 operates in accordance with the operation clock signal generated by the frequency-dividing circuit 23a. The frequency-dividing circuit 23a changes the frequency of the generated operation clock signal in accordance with the clock information ICLK. The frequency of the operation clock signal thus decreases in accordance with the set image size to reduce the power consumption during the processing of the color processing unit 23.

Similarly, a frequency-dividing circuit 24a of the image processing unit 24 and a frequency-dividing circuit 25a of the codec 25 respectively change the frequency of the generated operation clock signal in accordance with the clock information ICLK. This reduces power consumption during the processing of the image processing unit 24 and the codec 25.

One example of the thinning circuit 31 will now be described.

Figure 2:
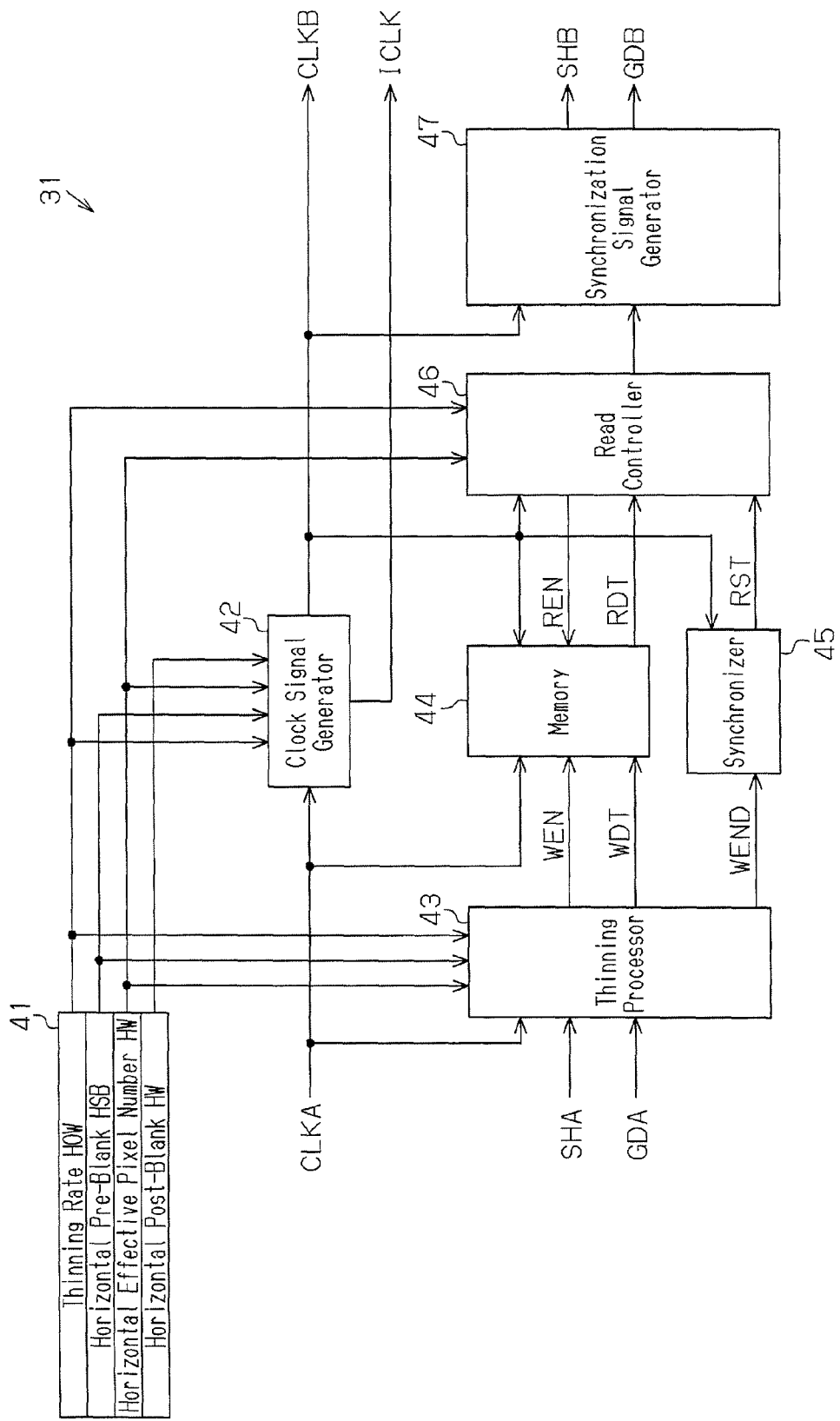
FIG. 2 is a block circuit diagram of a thinning circuit.

As illustrated in FIG. 2, the thinning circuit 31 includes a register 41, a clock signal generator 42, a thinning processor 43, a memory 44, a synchronizer 45, a read controller 46, and a synchronization signal generator 47.

The register 41 stores the thinning rate HOW, the horizontal pre-blank data piece number HSB, the effective horizontal pixel number HW, and the number of horizontal post-blank data pieces HEB. The thinning rate HOW corresponds to the ratio of the number of pixels of the input image data and the number of pixels of the output image data.

The clock signal generator 42 frequency-divides the first clock signal CLKA for transfer based on the numbers HOW, HSB, HW, HEB stored in the register 41, and generates the output second clock signal CLKB. The clock signal generator 42 generates the clock information ICLK based on the first clock signal CLKA and the second clock signal CLKB. For example, the clock information ICLK corresponds to the cycle of the second clock signal CLKB for transferring the effective pixel data that has undergone the thinning. For example, the clock information ICLK corresponds to the frequency-dividing ratio for generating the output second clock signal CLKB from the first clock signal CLKA for transferring the image data GDA.

In one example, the memory 44 includes two or more banks. Each bank may be a line memory having a memory capacity capable of storing the full size line data output from the image sensor 11 illustrated in FIG. 1. The memory 44 is, for example, a two-port memory.

The thinning processor 43 retrieves the image data GDA in accordance with the first clock signal CLKA for transfer and the horizontal synchronization signal SHA. The thinning processor 43 performs the thinning process on the image data GDA based on the thinning rate HOW, the horizontal pre-blank data piece number HSB, and the number of horizontal post-blank data pieces HEB stored in the register 41. Then, the thinning processor 43 stores the processed image data WDT in the memory 44.

In a simple thinning process, among a plurality of input data pieces (e.g., pixel values), for example, even numbered input data pieces are the non-thinning target data pieces, and odd numbered input data pieces are the thinning target data pieces. The thinning processor 43 stores the non-thinning target data pieces in the memory 44 but does not store the thinning target data pieces in the memory 44.

The thinning processor 43 detects the data pieces of the effective pixel data contained in one line data based on the horizontal synchronization signal SHA, the first clock signal CLKA, and the horizontal pre-blank data piece number HSB. For example, the thinning processor 43 counts the number of input pixel data pieces provided in accordance with the first clock signal CLKA after the input of the horizontal synchronization signal SHA. The thinning processor 43 compares the count value and the horizontal pre-blank data piece number HSB and determines whether or not the input pixel data piece is the effective pixel data piece. The thinning processor 43 acquires the effective pixel data piece provided after the image data of the horizontal pre-blank data piece number HSB.

After finishing the processing on the effective pixel data contained in one line data, the thinning processor 43 outputs a write end signal WEND. For example, the thinning processor 43 counts the number of effective pixel data pieces input according to the first clock signal CLKA. The thinning processor 43 compares the count value and the effective horizontal pixel number HW, and determines whether or not the thinning process on one line data has been finished based on the comparison result. After finishing the processing of the effective pixel data, the thinning processor 43 outputs the write end signal WEND having a certain level (e.g., H level "1"). The thinning processor 43 then switches the write bank of the memory 44. For example, the thinning processor 43 asserts the write enable signal WEN for the bank subject to writing, and negates the write enable signal WEN for the bank that is not subject to writing.

The synchronizer 45 operates in accordance with the second clock signal CLKB. The synchronizer 45 monitors the write end signal WEND of the thinning processor 43, and outputs a read start signal RST of a certain level (H level) in response to the write end signal WEND of the certain level (H level). The thinning processor 43 resets the write end signal WEND when the processing on the next line data has started. For example, the thinning processor 43 resets the write end signal WEND in response to the horizontal synchronization signal SHA. In one example, the resetting of the write end signal WEND refers to a change from the certain level (H level) to the reset level (L level). The synchronizer 45 resets the read start signal RST in response to the write end signal WEND of the reset level.

The read controller 46 operates in accordance with the second clock signal CLKB. The read controller 46 starts reading the image data stored in the memory 44 in response to the read start signal RST having the certain level (e.g., H level). For example, the read controller 46 asserts a read enable signal REN, outputs a read address signal (not illustrated) to the memory 44, and sequentially reads the image data that has undergone the thinning process stored in the memory 44. The read controller 46 then sends the thinned image data RDT output from the memory 44 to the synchronization signal generator 47.

The read controller 46 calculates a post-thinning effective pixel number Hwb based on the thinning rate HOW and the effective horizontal pixel number HW of the register 41. The post-thinning effective pixel number Hwb is a value obtained by dividing the effective horizontal pixel number HW before thinning by the thinning rate HOW (=HW/HOW). The read controller 46 reads the image data of the post-thinning effective pixel number Hwb from the memory 44, and switches the read bank. For example, the read controller 46 asserts the read enable signal REN for the read bank, and negates the read enable signal REN for the bank that has finished reading.

The synchronization signal generator 47 operates in accordance with the second clock signal CLKB. The synchronization signal generator 47 outputs a pulse-shaped horizontal synchronization signal SHB in response to the reading process of the read controller 46. In one example, the synchronization signal generator 47 outputs the pulse-shaped horizontal synchronization signal SHB when the read controller 46 asserts the read enable signal REN. In another example, the synchronization signal generator 47 outputs the pulse-shaped horizontal synchronization signal SHB in response to the read start signal RST output from the synchronizer 45.

The process executed by the thinning circuit 31 will now be described.

Figure 6:
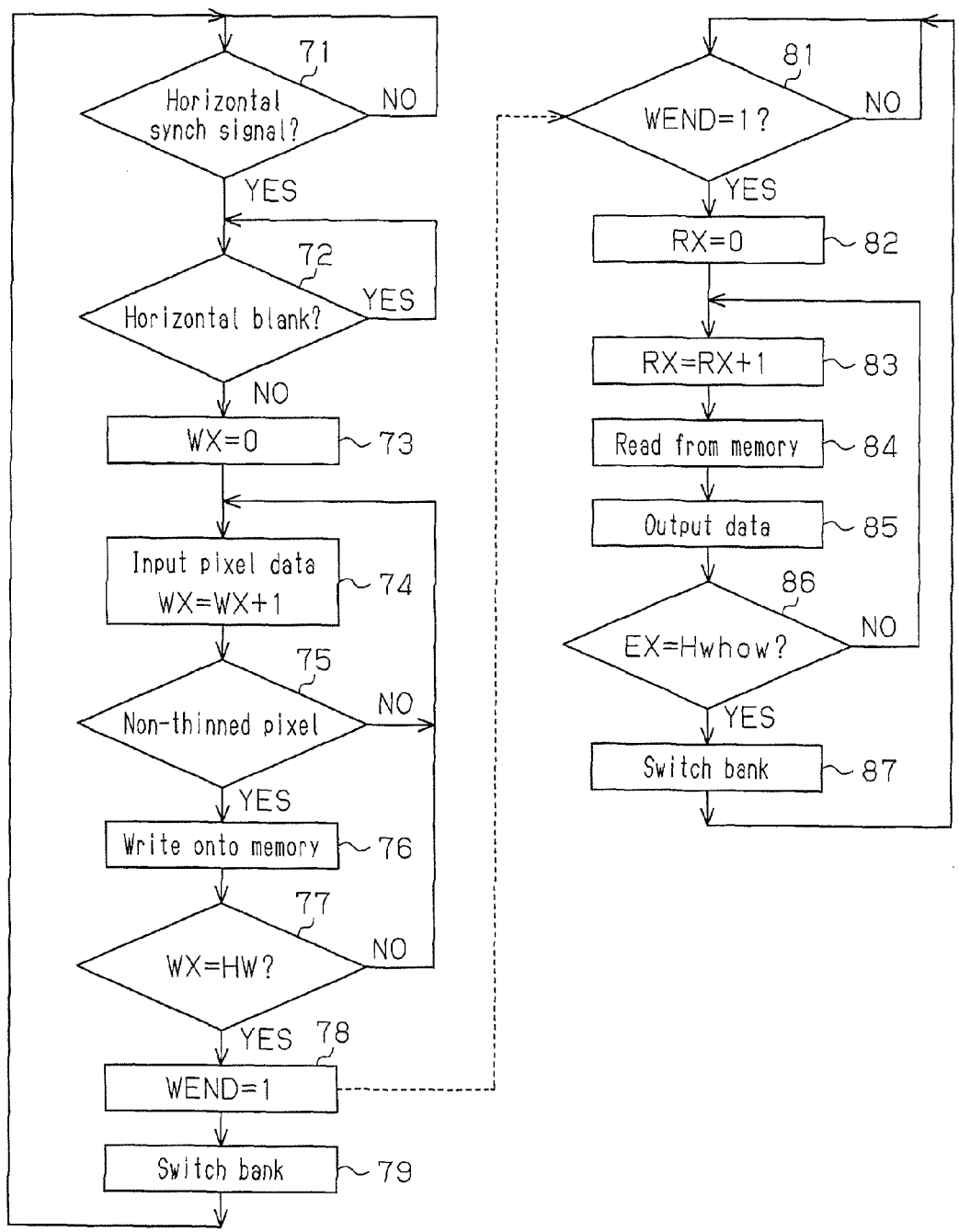
FIG. 6 is a flowchart illustrating the operation of the thinning circuit.

The left side in FIG. 6 illustrates a process in which the thinning processor 43 of the thinning circuit 31 writes the image data to the memory 44 (see FIG. 2). The right side in FIG. 6 illustrates a process in which the read controller 46 of the thinning circuit 31 reads the image data from the memory 44.

First, the processing of the thinning processor 43 will be described.

In step 71, the thinning processor 43 monitors the horizontal synchronization signal SHA. When detecting the horizontal synchronization signal SHA, the thinning processor 43 determines whether or not the received image data piece is the horizontal pre-blank data in step 72, and waits for the reception of the horizontal pre-blank data to be finished. In an alternative example, the thinning processor 43 counts the first clock signal CLKA during the reception of the image data, and compares the count value and the horizontal pre-blank data piece number HSB to determine the end of reception of the horizontal pre-blank data.

In step 73, the thinning processor 43 initializes (0) a count value WX. The count value WX corresponds to a pixel position in a horizontal direction of the received effective pixel.

In step 74, the thinning processor 43 then acquires the image data of the effective pixel, and increments the count value WX (WX=WX+1). In step 75, the thinning processor 43 determines whether the input pixel [WX] is the non-thinned pixel or the thinned pixel. The thinning processor 43 proceeds to step 74 if the input pixel [WX] is the thinned pixel, and proceeds to following step 76 if the input pixel [WX] is the non-thinned pixel.

The thinning processor 43 stores the input pixel [WX] in the memory 44 in step 76, and compares the count value WX and the effective horizontal pixel number HW in step 77. The thinning processor 43 proceeds to step 74 if the count value WX and the effective horizontal pixel number HW differ, and proceeds to step 78 if the count value WX and the effective horizontal pixel number HW are in conformance.

The thinning processor 43 asserts the write end signal WEND in step 78. The thinning processor 43 switches the bank to which data is written in the memory 44 in step 79. Then, the thinning processor 43 proceeds to step 71.

The processing of the read controller 46 will now be described.

The read controller 46 monitors the write end signal WEND in step 81. When detecting the write end signal WEND, the read controller 46 initializes the count value RX (=0) in step 82. The count value RX corresponds to the number of pixel data pieces read from the memory 44.

The read controller 46 then increments the count value RX (RX=RX+1) in step 83, reads the image data from the memory 44 in step 84, and outputs the image data in step 85.

The read controller 46 then compares the count value RX and the post-thinning effective pixel number Hwb in step 86. The read controller 46 proceeds to step 83 if the count value RX and the post-thinning effective pixel number Hwb differ, and proceeds to the next step 87 if the count value RX and the post-thinning effective pixel number Hwb are in conformance.

In step 87, the read controller 46 switches the reading subject bank in the memory 44, and then proceeds to step 81.

One example of the clock signal generator 42 will now be described.

Figure 3:
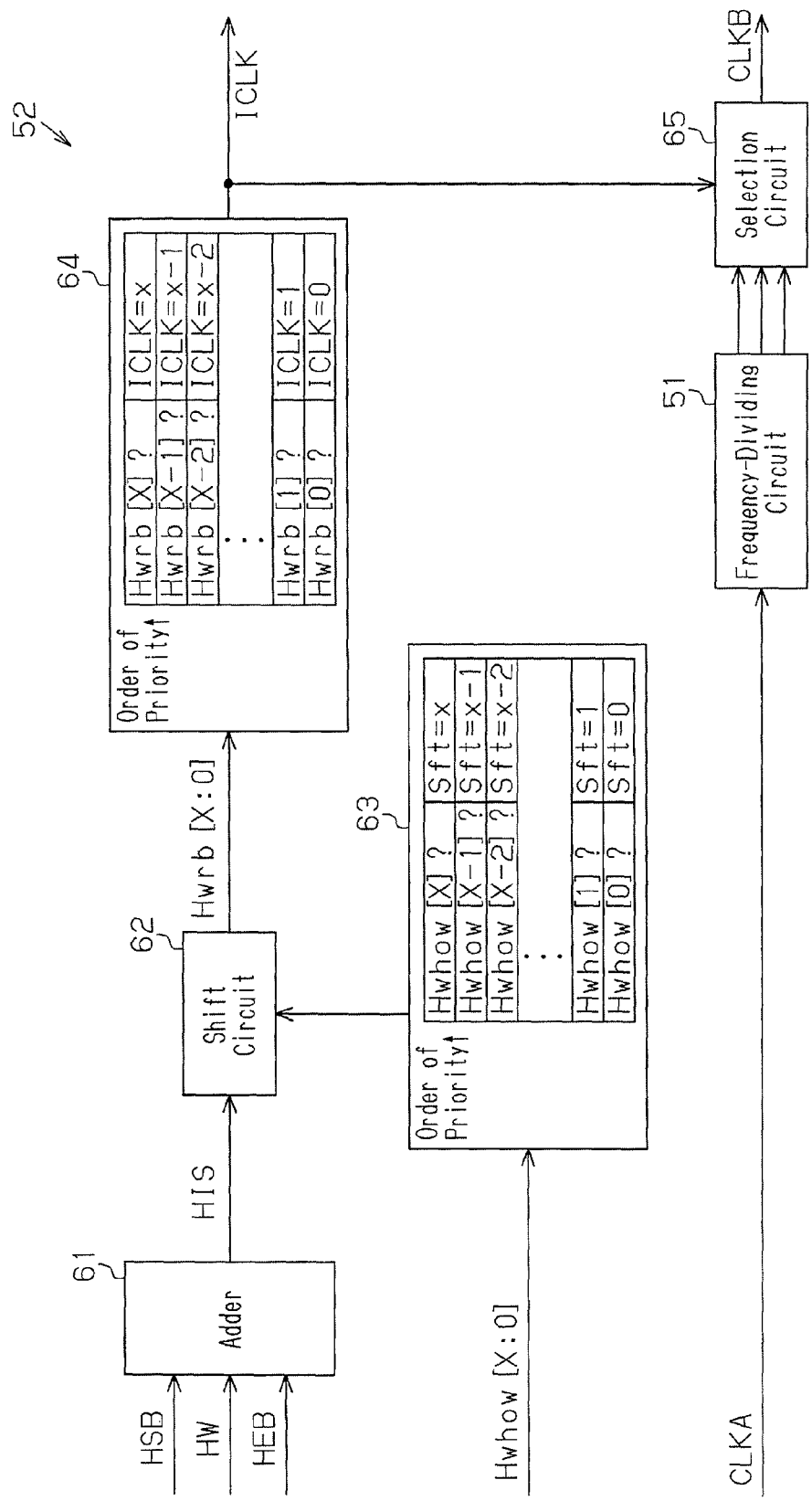
FIG. 3 is a block circuit diagram of a clock generation circuit.

The clock signal generator 42 will be described with reference to FIG. 3. The clock signal generator 42 includes a frequency-dividing circuit 51 and a control circuit 52. The frequency-dividing circuit 51 frequency-divides the first clock signal CLKA, and generates a plurality of frequency-divided clock signals having different frequency-dividing ratios.

The control circuit 52 includes an adder 61, a shift circuit 62, selectors 63, 63, and a clock signal selection circuit 65.

The adder 61 adds the horizontal pre-blank data piece number HSB, the effective horizontal pixel number HW, and the number of horizontal post-blank data pieces HEB stored in the register 41 illustrated in FIG. 2, calculates the number of input data pieces the thinning circuit 31 retrieves in one horizontal scanning period (HIS=HSB+HW+HEB), and outputs the calculated number of input data pieces HIS.

The selector 63 is provided with the data piece number Hwhow[X:0] of the image data written to the memory 44 of FIG. 2. The data piece number Hwhow[X:0] is, for example, the count value of the counter that is counted up each time the image data is written to the memory 44 in the thinning processor 43 illustrated in FIG. 2. The count value corresponds to the output data piece number HOS described in FIG. 4. A value "X" in the data piece number Hwhow[X:0] is changed in accordance with the horizontal size of the output image data from the image sensor 11 illustrated in FIG. 1.

Among a plurality of bits in the data piece number Hwhow[X:0], the selector 63 outputs a value corresponding to a bit value having a bit value "1" or a value indicating this bit position as a shift amount Sft. In the example of FIG. 3, the selector 63 includes a priority map in which an order of priority is set for each bit position. Priority is given to each position of the input data. For example, the most significant bit (MSB) has the highest priority, and the order of priority decreases from the most significant bit (MSB) to the least significant bit (LSB). The selector 63 outputs a value corresponding to the position of the most significant bit having the bit value of "1" among the bits of the data piece number Hwhow[X:0] as a shift amount Sft.

For example, when the data piece number Hwhow [X:0] is [250], the binary expression of the data piece number Hwhow [X:0] is "00011111010B". The selector 63 outputs "7", which corresponds to the position of the most significant side bit having the bit value "1" as the bit shift amount Sft.

The shift circuit 62 shifts each bit of the number of input data pieces HIS output from the adder 61 toward the right side (toward the least significant bit side) by the bit shift amount Sft output from the selector 63, and sets "0" for the bit value of the bit position that has become vacant after the shift. The shift circuit 62 outputs the shifted value Hwrb[X:0].

In the same manner as the selector 63, the selector 64 outputs a value corresponding to the position of the most significant side bit having the bit value of "1" among the bits in the shifted data piece value Hwrb[X:0] as the bit information ICLK. The clock information ICLK output from selector 64 corresponds to the ratio of the frequency of the second clock signal CLKB relative to the frequency of the first clock signal CLKA. For example, when the number of input data pieces HIS output from the adder 61 is "1000", the binary expression of the number of input data pieces HIS is "001111101000B". When the number of input data pieces HIS is shifted toward the right side by the bit shift amount Sft, the value Hwrb:[X:0] becomes "0111B". Therefore, the selector 64 outputs "2", which corresponds to the position of the most significant side bit in which the bit value is "1" among the bits of "0111B", as the clock information ICLK.

The clock signal selection circuit 65 selects one of the plurality of frequency-divided clock signals generated by the frequency-dividing circuit 51 based on the clock information ICLK. The clock signal selection circuit 65 generates a frequency-divided clock signal having the frequency corresponding to the frequency-dividing ratio (e.g., four) with the clock information ICLK (e.g., two) as an index of "2". For example, when the clock information ICLK is "2, the frequency-divided clock signal in which the first clock signal CLKA is frequency-divided to ¼ is generated. The clock signal selection circuit 65 outputs the selected frequency-divided clock signal as the second clock signal CLKB.

The processing of the clock signal generator 42 will now be described.

Figure 7:
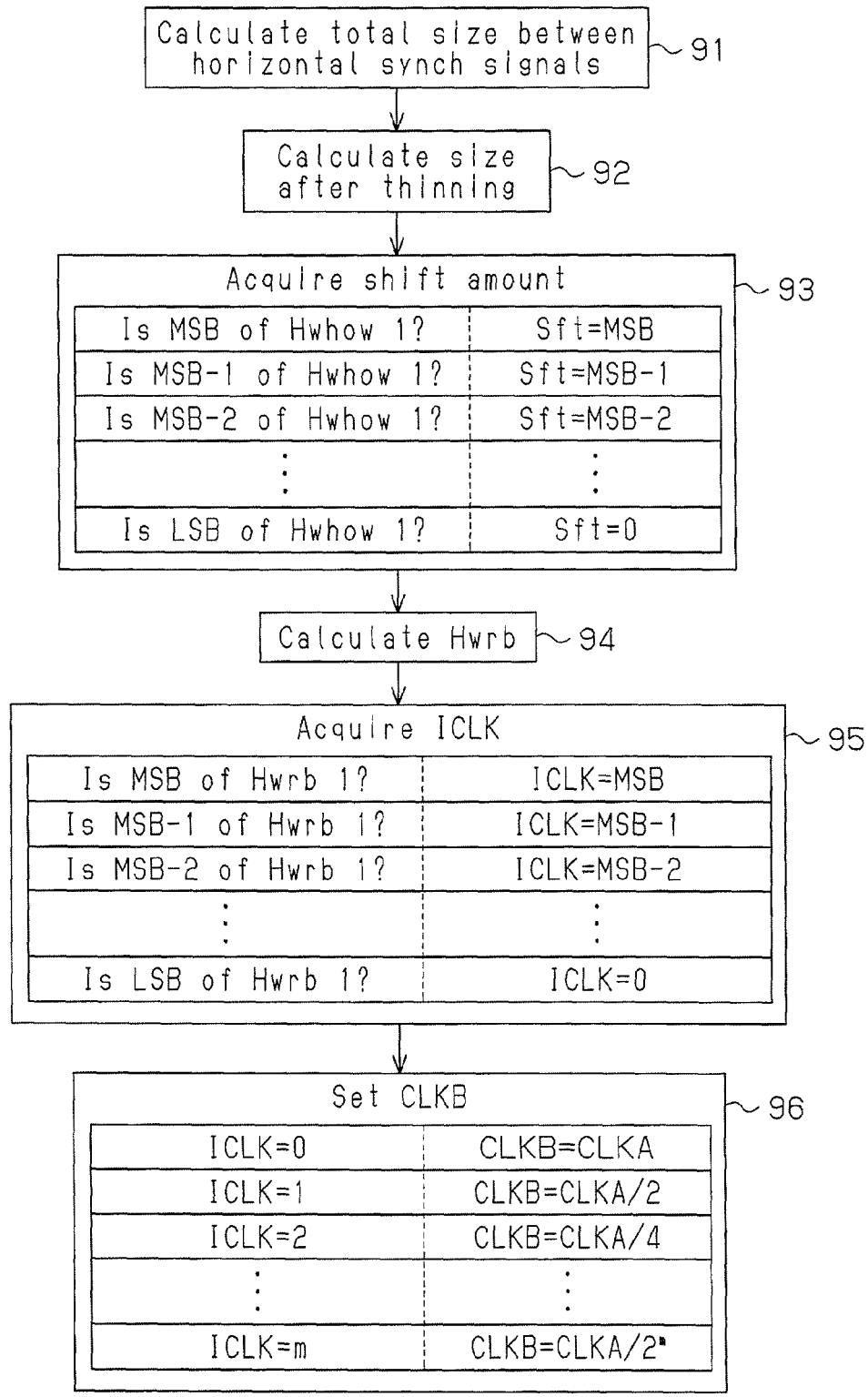
FIG. 7 is a flowchart illustrating the operation of the clock generation circuit.

As illustrated in FIG. 7, in step 91, the clock signal generator 42 calculates the total size, that is, the number of data pieces HIS of the image data transferred between the horizontal synchronization signals. In the illustrated example, the adder 61 of the clock signal generator 42 adds the horizontal pre-blank data piece number HSB, the effective horizontal pixel number HW, and the number of horizontal post-blank data pieces HEB to calculate the total size.

Then, in step 92, the clock signal generator 42 acquires the data piece number Hwhow after the thinning. The data piece number Hwhow is a value equal to the number of data pieces HOS written to the memory 44 in FIG. 2. The data piece number Hwhow (HOS) may be acquired by counting the number of data pieces of the thinned image data WDT written to the memory 44 in FIG. 2.

In step 93, the clock signal generator 42 acquires the bit shift amount Sft based on the data piece number Hwhow after the thinning. The clock signal generator 42 sequentially determines whether or not the value of each bit of the data piece number Hwhow is "1" from the most significant bit (MSB) to the least significant bit (LSB) of the data piece number Hwhow. The clock signal generator 42 holds the value corresponding to the position of the bit that is first determined as having the bit value of "1" as the bit shift amount Sft.

In step 94, the clock signal generator 42 calculates the data piece value Hwrb after the shifting based on the total size HIS and the bit shift amount Sft. For example, the clock signal generator 42 calculates the data piece value Hwrb after the shifting by shifting plural bits indicating the total size HIS toward the right side by the bit shift amount Sft.

In step 95, the clock signal generator 42 acquires the clock information ICLK based on the data piece value Hwrb after the shifting. In the same manner as step 93, the clock signal generator 42 determines whether or not the value of the bit position of the data piece value Hwrb after the shifting is "1" from the most significant bit (MSB) toward the least significant bit (LSB) of the data piece value Hwrb after the shifting. The clock signal generator 42 holds the value corresponding to the position of the bit first determined as having the bit value of "1" as the clock information ICLK.

In step 96, the clock signal generator 42 sets the second clock signal CLKB based on the clock information ICLK. For example, the clock signal generator 42 sets the frequency of the second clock signal CLKB based on the clock information ICLK and the frequency of the first clock signal CLKA. The clock signal generator 42 sets the frequency of the second clock signal CLKB to be equal to the frequency of the first clock signal CLKA when the clock information ICLK is "0". The clock signal generator 42 sets the frequency of the second clock signal CLKB to ½ of the frequency of the first clock signal CLKA when the clock information ICLK is "1". The clock signal generator 42 sets the frequency of the second clock signal CLKB to ¼ of the frequency of the first clock signal CLKA when the clock information ICLK is "2".

The operation of the thinning circuit 31 will now be described.

Figure 8:
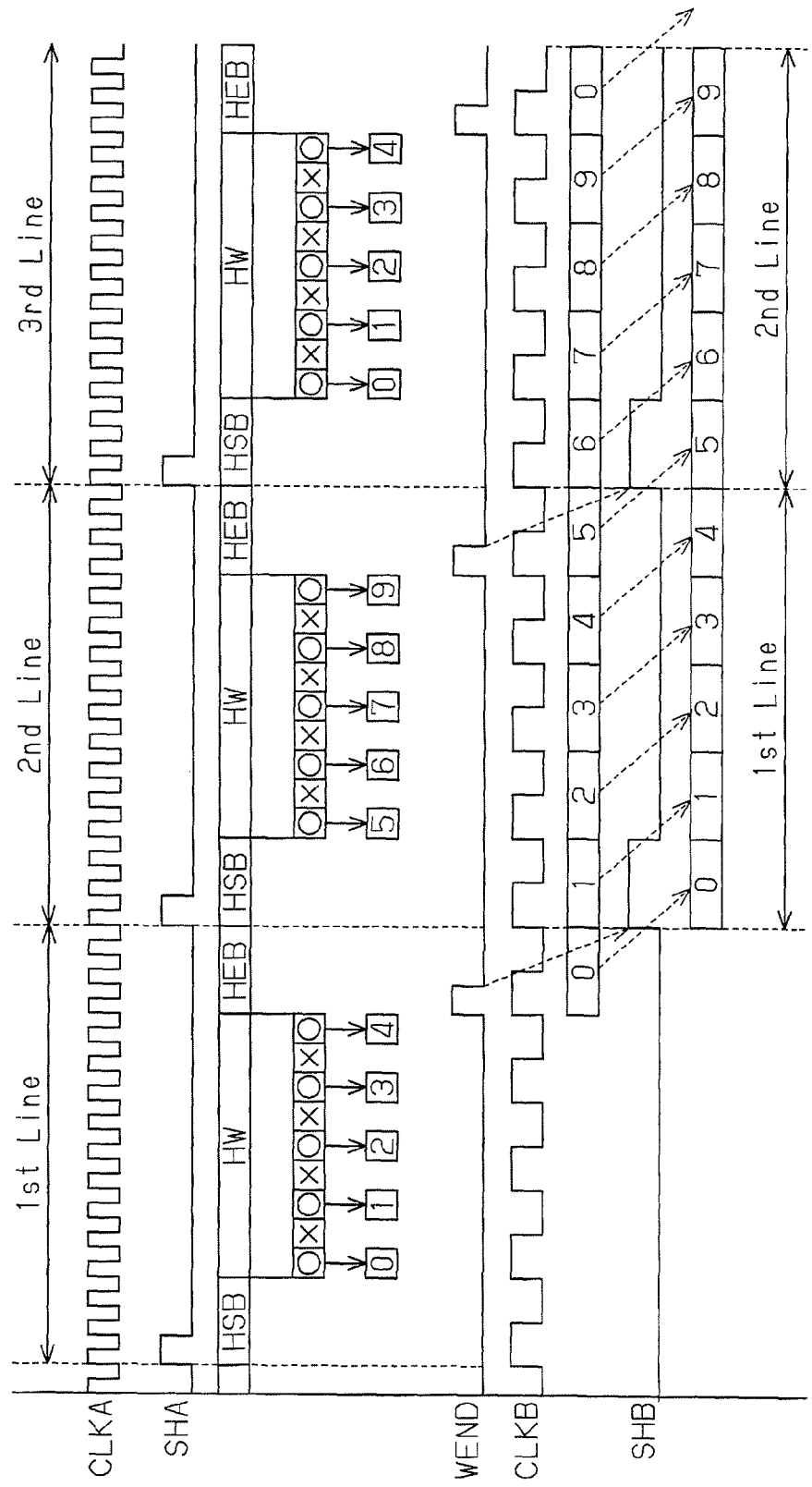
FIG. 8 is a timing chart illustrating the operation related to the horizontal thinning process.

As illustrated in FIG. 8, the image data of the first line is transferred between the two horizontal synchronization signals SHA. The image data of the first line includes the blank data of the horizontal pre-blank data piece number HSB, the effective image data of the effective horizontal pixel number HW, and the blank data of the number of horizontal post-blank data pieces HEB. In FIG. 8, for the plurality of pixels contained in the effective image data, each circle represents a non-thinned pixel, and each cross represents a pixel subject to the thinning. The thinning circuit 31 stores only the non-thinned pixels in the memory 44 illustrated in FIG. 2. In the example of FIG. 8, each line includes nine pixels, and the image data of the first line includes non-thinned pixels [0] to [4].

The thinning circuit 31 (thinning processor 43) outputs the pulse-shaped write end signal WEND when the last non-thinned pixel [4] of the first line is stored in the memory 44. In response to the write end signal WEND, the thinning circuit 31 (read controller 46) starts reading data from the memory 44.

In this case, the thinning circuit 31 (read controller 46) reads data in synchronization with the second clock signal CLKB corresponding to the frequency-dividing ratio (frequency) set based on the data piece number Hwhow of after the thinning in the memory 44. In the illustrated example, the read controller 46 first reads pixel [0] from the memory 44 in synchronization with the second clock signal CLKB. The read controller 46 outputs pixel [0] in synchronization with the horizontal synchronization signal SHB. Then, in the same manner, pixel [1] is read from the memory 44 in synchronization with the second clock signal CLKB, and pixel [1] is output. Likewise, pixels [2], [3], [4] read from the memory 44 are output. In this manner, the thinned image data of the first line is output.

The read controller 46 then reads pixel [5] of the second line from the memory 44, and outputs pixel [5] in synchronization with the next horizontal synchronization signal SHB. Subsequently, in the same manner, the read controller 46 outputs pixels [6] to [9] read from the memory 44. The thinned image data of the second line is output in such a manner.

Figure 9:
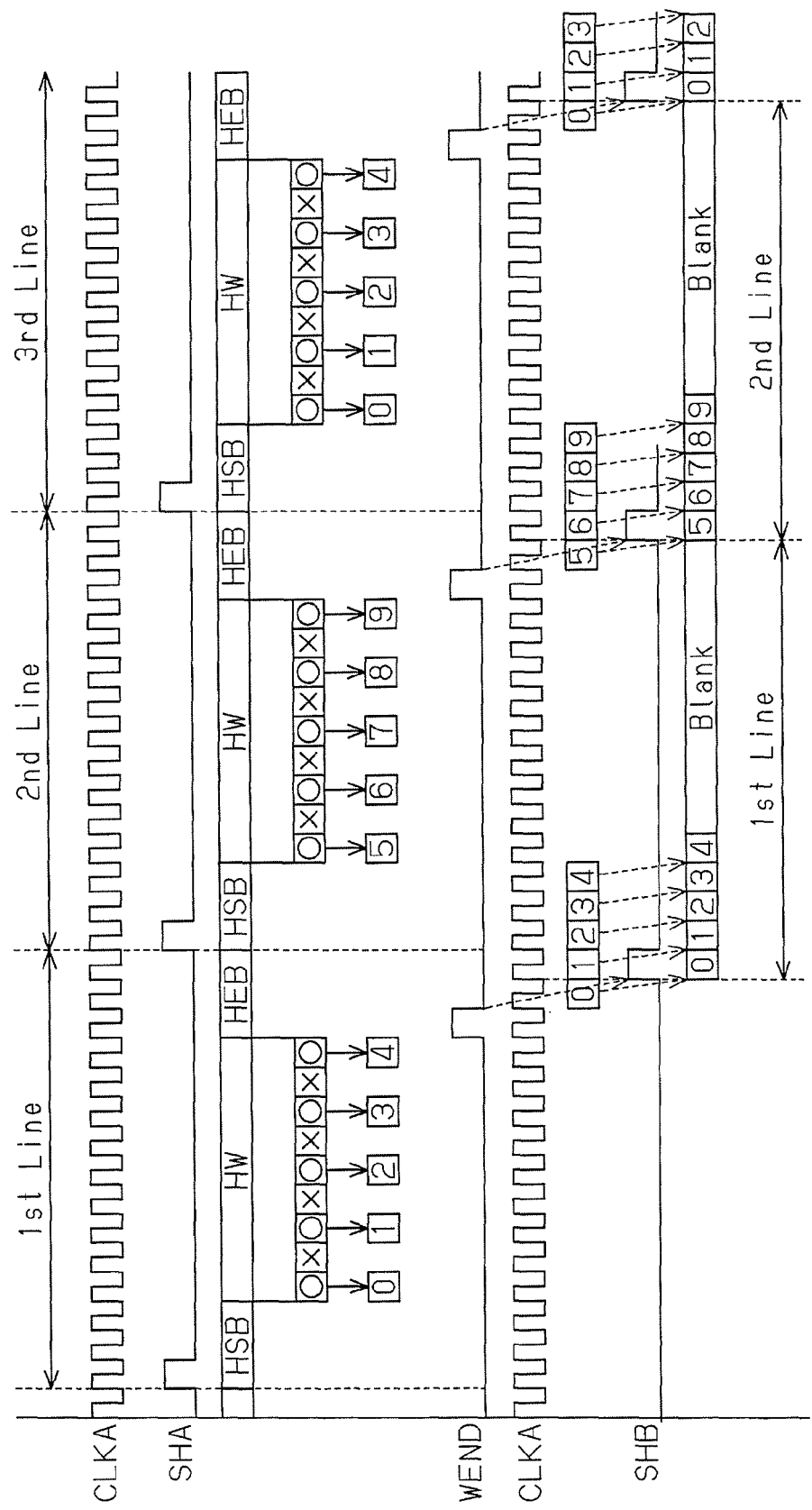
FIG. 9 is a timing chart illustrating the operation related to the horizontal thinning process.

FIG. 9 illustrates a thinning circuit of a referential example that outputs pixels in accordance with the clock signal CLKA. In the referential example, non-thinned pixels [0] to [4] of the first line are sequentially read in synchronization with the first clock signal CLKA from the memory 44 in the same manner as FIG. 8. Pixels [0] to [4] are sequentially output in response to the horizontal synchronization signal SHB.

However, the storage of the image data of the second line to the memory 44 is not finished when the thinned image data of the first line is completed. This produces a blank period until the pixels of the next line are output. The first clock signal CLKA is continuously output even in such a blank period. Therefore, a circuit for generating the first clock signal CLKA and a circuit that operates in accordance with the first clock signal CLKA are active during the blank period. Such a blank period is produced in the same manner when a different image processing is performed. These blank periods are unnecessary.

When the storing of the image data of the second line to the memory 44 is finished (pulse-shaped write end signal WEND), pixels [5] to [9] of the second line are sequentially read from the memory 44. After pixel [9] is output, a blank period continues until the data of the next line are output.

Compared to the referential example illustrated in FIG. 9, the present embodiment reduces such unnecessary blank periods. Thus, the power consumption of the imaging device 10 is small compared to the referential example illustrated in FIG. 9. Since the frequency of the second clock signal CLKB is lower than the frequency of the first clock signal CLKA, the imaging device 10 may not execute a high speed pixel output operation. This reduces power consumption during the processing of the imaging device 10.

A case in which the thinning process is performed has been described. However, power consumption may also be reduced when the thinning process is not performed.

Figure 10A:
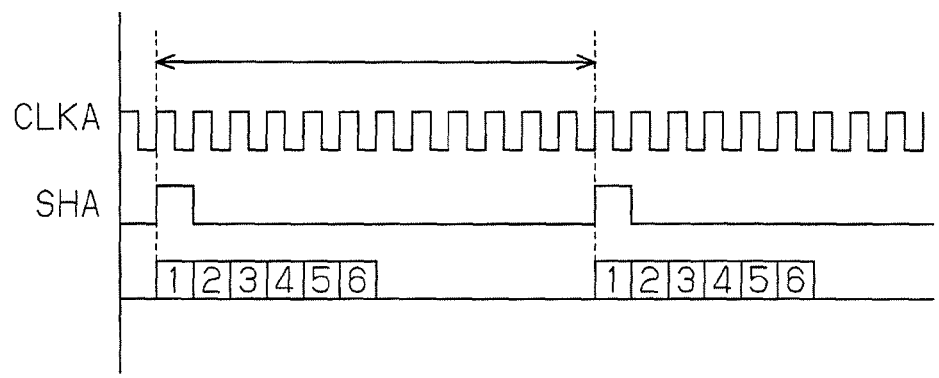
FIGS. 10A to 10C are explanatory views illustrating output pixels and a clock signal.

More specifically, as illustrated in FIG. 10A, when outputting pixels [1] to [6] based on the first clock signal CLKA, a blank period continues until pixel [1] of the next line is output after pixel [6] is output. The arrow in FIG. 10A indicates a single horizontal period.

Figure 10B:
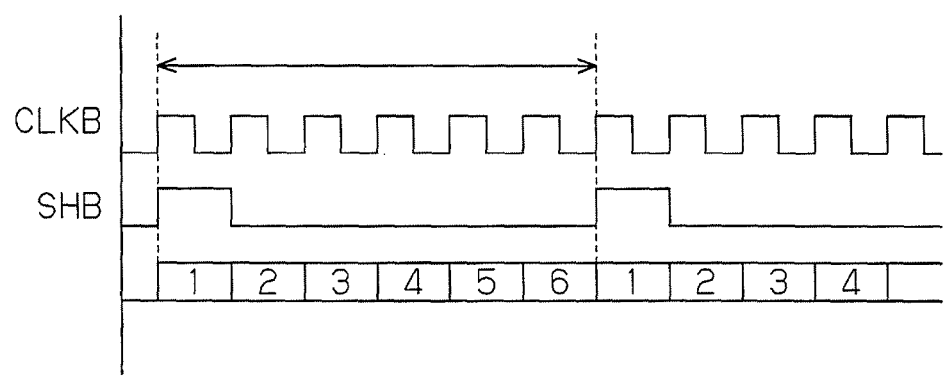

In contrast, the thinning rate HOW is "1" in the example illustrated in FIG. 10B. In this case, pixels [1] to [6] are output in the single horizontal period in accordance with the second clock signal CLKB. That is, the frequency of the second clock signal CLKB is set in accordance with the number of data pieces excluding the blank data of the horizontal pre-blank data piece number HSB and the blank data of the number of horizontal post-blank data pieces HEB illustrated in FIG. 4. Thus, the power consumption is reduced even when the thinning process is not performed.

Figure 10C:
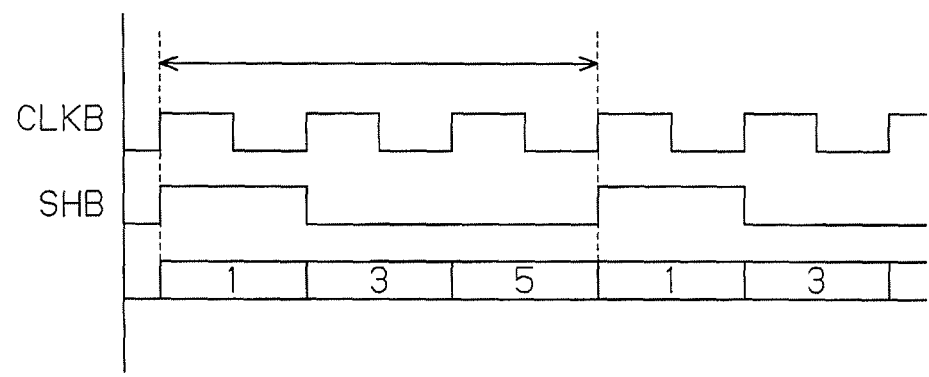

In the example illustrated in FIG. 10C, the thinning process is performed and processed pixels [1], [3], [5] are output. Since the number of pixels that are output is reduced, the frequency of the second clock signal CLKB of FIG. 10C becomes lower than that in FIG. 10B, and power consumption is further reduced.

The thinning process performed in the horizontal direction for the image data has been described above. The same may be applied to the thinning process in the vertical direction.

Figure 11:
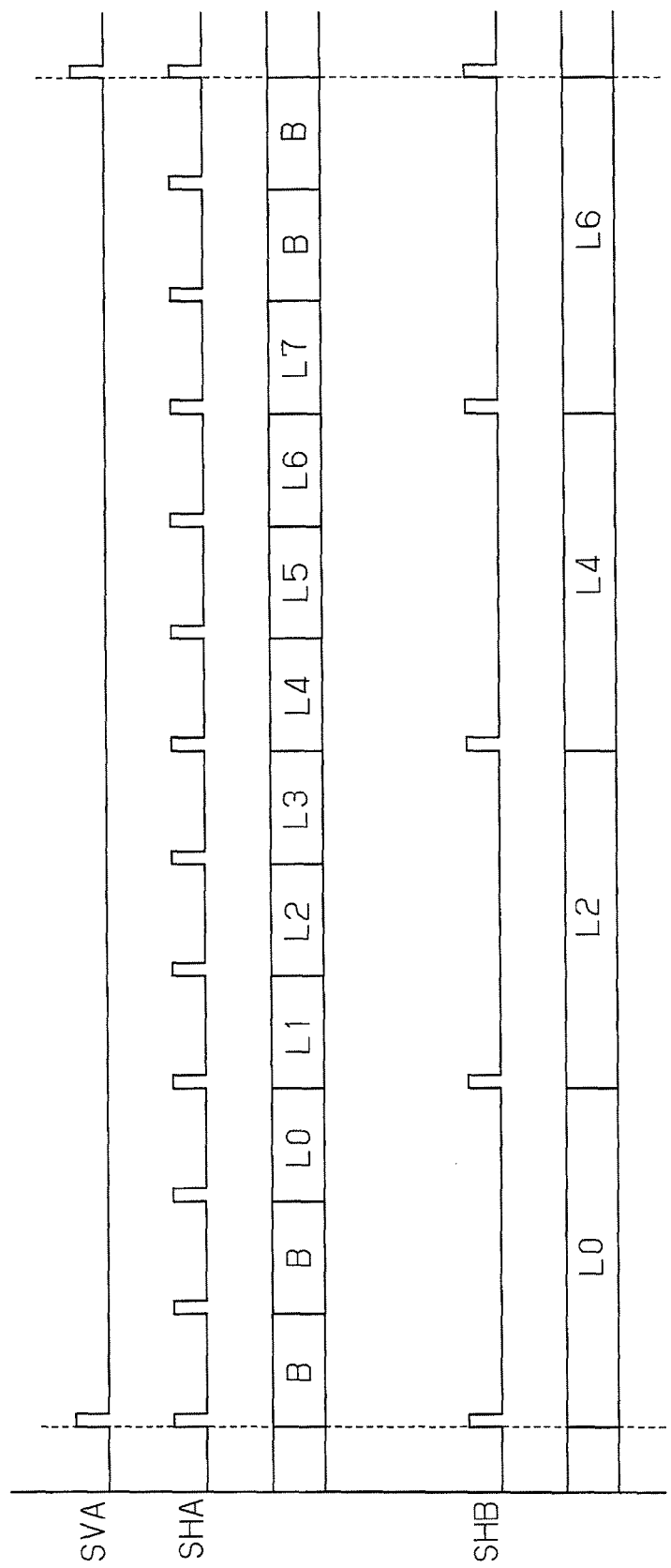
FIG. 11 is a timing chart illustrating the operation related to a vertical thinning process.

More specifically, as illustrated in FIG. 11, the image sensor 11 outputs a plurality of horizontal synchronization signals SHA during the vertical synchronization signal SVA, and outputs the data of each line during the horizontal synchronization signal SHA. FIG. 11 illustrates the data B of the vertical pre-blank for two lines, the line data L0 to L7 including the effective image data, and the data B of the vertical post-blank for two lines. The vertical pre-blank and the vertical post-blank are not output. The thinning process is performed on line data L0 to L7 thereby outputting line data L0, L2, L4, L6. Thus, the line data number transferred between the vertical synchronization signals SVA becomes "4" due the thinning process, and the frequency of the second clock signal CLKB may be lowered accordingly. This reduces power consumption during processing.

In one example, the thinning process is not performed on the line data L0 to L7, and the vertical pre-blank and the vertical post-blank are not output. In this case, the frequency of the second clock signal CLKB decrease and the power consumption is reduced accordingly.

The present embodiment has the advantages described below.

(1) The thinning rate HOW, the horizontal pre-blank data piece number HSB, the effective horizontal pixel number HW, and the number of horizontal post-blank data pieces HEB are stored in the register 41 of the thinning circuit 31. The thinning rate HOW corresponds to the number of pixels of the input image data and the number of pixels of the output image data. The clock signal generator 42 frequency-divides the transfer first clock signal CLKA based on the numbers HOW, HSB, HW, HEB stored in the register 41, and generates the output second clock signal CLKB. The clock information ICLK corresponding to the second clock signal CLKB is also generated.

The thinning processor 43 retrieves the image data GDA in accordance with the transfer first clock signal CLKA and the horizontal synchronization signal SHA. The thinning processor 43 performs the thinning process on the image data GDA based on the thinning rate HOW, the horizontal pre-blank data piece number HSB, and the number of horizontal post-blank data pieces HEB stored in the register 41, and stores the thinned image data WDT in the memory 44. The read controller 46 sequentially reads the data pieces of the thinned image data WDT from the memory 44 in accordance with the second clock signal CLKB, and provides the read data pieces to the synchronization signal generator 47.

The reading of the data is performed in synchronization with the second clock signal CLKB corresponding to the frequency-dividing ratio (frequency) set based on the data piece number Hwhow stored in the memory 44. Since the frequency of the second clock signal CLKB is lower than the frequency of the first clock signal CLKA, a high speed operation may not be required and the power consumption may be small. This reduces power consumption during the processing of the imaging device 10.

(2) The selector 63 of the clock signal generator 42 outputs the maximum value of the bit positions in which the bit value is "1" in the data piece number Hwhow[X:0] as the bit shift amount Sft. The shift circuit 62 shifts each bit of the number of input data pieces HIS output from the adder 61 toward the right side (least significant bit side) by the bit shift amount Sft output from the selector 63, and outputs the shifted value Hwrb[X:0]. In the same manner as the selector 63, the selector 64 outputs the clock information ICLK of the maximum value of the values of the bit positions set with the bit position of "1" of the bits in the data piece value Hwrb[X:0] after the shifting.

The clock information ICLK output from the selector 64 corresponds to the clock ratio of the second clock signal CLKB relative to the first clock signal CLKA. Therefore, the clock information ICLK is generated without performing the division. The circuit scale of the shift circuit 62 and the selectors 63, 64 is smaller than the scale of a division circuit. This suppresses increases in the circuit scale of the image processing device 12.

It should be apparent to those skilled in the art that the present invention may be embodied in many other specific forms without departing from the spirit or scope of the invention. Particularly, it should be understood that the present invention may be embodied in the following forms.

In the thinning processor 43, an average value of the image data of a plurality of pixels corresponding to the thinning rate HOW may be calculated, and the image data of the calculated average value may be output. The image data of a non-thinned pixel may be corrected based on the image data of a thinned pixel and the image data of two peripheral pixels adjacent in, for example, the thinning direction (horizontal direction), and the corrected image data may be output.

The image data GDA of the embodiment described above has a format including the blank data GBL added before and after the effective data GDP. However, one or both of the blank data before and the blank data after the effective data GDP may be omitted. When performing the thinning process on the image data of only effective data GDP having no blank data, the frequency of the second clock signal CLKB for outputting the image data of after the thinning stored in the memory 44 according to the thinning rate HOW in the thinning process is set according to the data piece number Hwhow of the image data of after the thinning. This reduces power consumption.

The correction circuit 32 of the pre-processing unit 22 may be omitted. The thinning circuit 31 may store the image data in the memory 13. The thinning circuit 31 may provide the image data to a processing unit other than the memory 13 such as the color processing unit 23.

The correction circuit 32 may be connected to the bus 27 in the same manner as the color processing unit 23 and the like or may perform the correction processing on the image data read from the memory 13.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although embodiments of the present invention have been described in detail, it should be understood that various changes, substitutions, and alterations could be made hereto without departing from the spirit and scope of the invention.

What is claimed is:

1. An image processing device comprising:
   a thinning processor that receives image data in accordance with a first clock signal, the image data output from an image sensor for a certain period, wherein the thinning processor performs, in accordance with the first clock signal, a thinning process for resizing effective data contained in the image data based on the number of effective horizontal pixels in the effective data and a thinning rate to generate thinned image data which is a reduced-scale copy of the effective data, and the thinning processor stores the thinned image data in a memory in accordance with the first clock signal;
   a clock signal generator that generates a second clock signal having a frequency based on the number of data pieces of the image data provided in the certain period, the number of effective horizontal pixels, and the thinning rate; and a read controller that reads the thinned image data from the memory in accordance with the second clock signal, wherein the clock signal generator includes a frequency-dividing circuit that frequency-divides the first clock signal and outputs a plurality of frequency-divided clock signals, a first selector that selects one bit having a certain bit value from the number of data pieces of the thinned image data stored in the memory in accordance with the number of effective horizontal pixels and the thinning rate to output a bit shift amount corresponding to a position of the selected bit, a shift circuit that shifts a binary expression of the number of data pieces of the image data provided in the certain period by the bit shift amount to generate and output the number of the shifted data pieces, a second selector that selects one bit having a certain bit value from the number of shifted data pieces to output clock information corresponding to a position of the selected bit, and a clock signal selection circuit that selects one of the frequency-divided clock signals of the frequency-dividing circuit based on the clock information to output the selected frequency-divided clock signal as the second clock signal.

2. The image processing device according to claim 1, further comprising:

a register that stores the number of effective horizontal pixels, the thinning rate, the number of horizontal pre-blank data pieces output from the image sensor before the effective data of the image data, and the number of horizontal post-blank data pieces output from the image sensor after the effective data of the image data, wherein the clock signal generator includes an adder that calculates the number of data pieces of the image data provided in the certain period based on the number of horizontal pre-blank data pieces, the number of horizontal post-blank data pieces, and the number of effective horizontal pixels.

3. The image processing device according to claim 1, wherein the thinning processor counts the number of data pieces of the thinned image data written to the memory to output a count value; and the first selector outputs the bit shift amount corresponding to the bit position using the count value output from the thinning processor as the number of data pieces of the thinned image data.

4. An image processing device comprising:

a thinning processor that receives image data in accordance with a first clock signal, the image data output from an image sensor for a certain period, wherein the thinning processor performs, in accordance with the first clock signal, a thinning process for resizing effective data contained in the image data based on the number of effective horizontal pixels in the effective data and a thinning rate to generate thinned image data which is a reduced-scale copy of the effective data, and the thinning processor stores the thinned image data in a memory in accordance with the first clock signal;

a clock signal generator that generates a second clock signal having a frequency based on the number of data pieces of the image data provided in the certain period, the number of effective horizontal pixels, and the thinning rate; and a read controller that reads the thinned image data from the memory in accordance with the second clock signal, wherein the clock signal generator includes a frequency-dividing circuit that frequency-divides the first clock signal to generate a plurality of frequency-divided clock signals, wherein the clock signal generator calculates the number of data pieces of the thinned image data stored in the memory by dividing the number of effective horizontal pixels by the thinning rate, calculates the clock information by dividing the number of data pieces of the image data provided in the certain period by the number of data pieces of the thinned image data, selects one of the frequency-divided clock signals of the frequency-dividing circuit based on the clock information, and outputs the selected frequency-divided signal as the second clock signal.

5. An image processing device comprising:

a thinning processor that receives image data in accordance with a first clock signal, the image data output from an image sensor for a certain period, wherein the thinning processor performs, in accordance with the first clock signal, a thinning process for resizing data contained in the image data based on the number of effective horizontal pixels in the effective data and a thinning rate to generate thinned image data which is a reduced-scale copy of the effective data, and the thinning processor stores the thinned image data in a memory in accordance with the first clock signal;

a clock signal generator that generates a second clock signal having a frequency based on the number of data pieces of the image data provided in the certain period, the number of effective horizontal pixels, and the thinning rate; and a read controller that reads the thinned image data from the memory in accordance with the second clock signal, wherein the certain period is a single horizontal scanning period determined by a cycle of a first horizontal synchronization signal, the number of pulses of the second clock signal in the single horizontal scanning period is less than the number of pulses of the first clock signal in the single horizontal scanning period, the image data is a single line of image data including blank data and effective data that excludes the blank data, the thinning processor removes the blank data and the number of effective pixel data pieces corresponding to the thinning rate from the effective data in the single line of image data to generate a single line of thinned image data, and the thinning processor stores the single line of thinned image data in the memory, the read controller reads the thinned image data of one line from the memory in accordance with the second clock signal, and the read controller outputs the read single line of thinned image data in accordance with a second synchronization signal corresponding to the second clock signal in a period that is substantially the same as a single horizontal scanning period in which the thinning processor receives image data for a next single line.

6. A method for processing an image, the method comprising:

receiving, with a thinning processor, image data in accordance with a first clock signal, the image data output from an image sensor for a certain period;

performing, with the thinning processor in accordance with the first clock signal, a thinning process for resizing effective data contained in the image data based on the number of effective horizontal pixels of the effective data and a thinning rate to generate thinned image data which is a reduced-scale copy of the effective data;

storing, with the thinning processor in accordance with the first clock signal, the thinned image data in a memory;

generating, with a clock signal generator, a second clock signal having a frequency based on the number of data pieces of the image data provided in the certain period, the number of effective horizontal pixels, and the thinning rate;

reading, with a read controller, the thinned image data from the memory in accordance with the second clock signal;

frequency-dividing the first clock signal to generate a plurality of frequency-divided clock signals;

selecting one bit having a certain bit value from the number of data pieces of the thinned image data based on the number of effective horizontal pixels and the thinning rate to generate a bit shift amount corresponding to a position of the selected bit;

generating the number of shifted data pieces in which a binary expression of the number of data pieces of the image data provided in the certain period is shifted by the bit shift amount;

selecting one bit having a certain bit value from the number of shifted data pieces to generate clock information corresponding to a position of the selected bit; and selecting one of the frequency-divided clock signals based on the clock information and outputting the selected frequency-divided clock as the second clock signal.

7. The method according to claim 6, further comprising:

storing in a register the number of effective horizontal pixels, the thinning rate, the number of horizontal pre-blank data pieces output from the image sensor before the effective data in the image data, and the number of horizontal post-blank data pieces output from the image sensor after the effective data in the image data; and calculating the number of data pieces of the image data provided in the certain period by adding the number of horizontal pre-blank data pieces, the number of horizontal post-blank data pieces, and the number of effective horizontal pixels.

* * * * *